United States Patent Office 3,489,722
Patented Jan. 13, 1970

3,489,722
PROCESS FOR THE PREPARATION OF AROMATIC POLYESTER
Shinta Kotani, Yasuhito Bandou, and Junsuke Takeishi, Matsuyama-shi, Japan, assignors to Teijin Limited, Osaka, Japan, a corporation of Japan
No Drawing. Filed Aug. 15, 1966, Ser. No. 572,235
Claims priority, application Japan, Aug. 21, 1965, 40/50,964
Int. Cl. C08g 17/015
U.S. Cl. 260—75
8 Claims

ABSTRACT OF THE DISCLOSURE

An improved process for preparing white fiber forming polyesters involving a conventional direct esterification or ester interchange reaction wherein at least the second stage of the process, i.e., the polycondensation, is conducted in the presence of
(a) a catalyst comprising a cerium or lanthanum compound soluble in a diglycol ester of a dicarboxylic acid or an oligomer and
(b) as a color inhibitor from 0.0005–0.05% by weight of the fiber forming polyester, calculated as metal phosphorus, a phosphorus compound of the formula

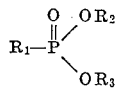

wherein $R_1$ is an aralkyl radical and $R_2$ and $R_3$ are each selected from the group consisting of hydrogen, alkyl, cycloalkyl and aryl radicals. It has been found that the use of a minor amount of the specific phosphorus compounds allows for the color inhibition while not decreasing the catalytic activity of the cerium and lanthanum compounds.

---

The present invention relates to an improved process for the preparation of aromatic polyesters of excellent whiteness.

Conventionally, aromatic polyesters are prepared by subjecting an acid component and a glycol component to direct esterification reaction or ester-interchange reaction in the presence of a catalyst in the accepted manner to form polyester monomer and it oligomer, followed by further polycondensation of the product in heated and molten state under a reduced pressure. In that case, for the preparation of fiber- or film-forming polyester, dicarboxylic acid of which at least 80 mol % is terephthalic acid, or its lower aliphatic ester is normally used as the acid component. And, the practice of directly reacting such dicarboxylic acid with glycol is called direct esterification reaction, and the reaction of the lower aliphatic ester of the dicarboxylic acid with glycol is called ester-interchange reaction. The reaction to produce diglycol ester of the dicarboxylic acid or its oligomer by such direct esterification or ester-interchange reaction is referred to as the first stage reaction, while the reaction to produce high polyester by polycondensation of the diglycol ester or its oligomer is often referred to as the second stage reaction.

In the past, many catalysts were proposed for the preparation of aromatic polyesters, among which particularly cerium compounds and lanthanum compounds, inter alia, those which are soluble in the diglycol ester of the dicarboxylic acid or its oligomer, are well known for their markedly high catalytic activity in the first and second stage reactions for polyester preparation.

However, under such preparation conditions as will allow the full utilization of the high catalytic activity, side reaction to form, for instance, coloring matter cannot be inhibited. Such coloring matter yellows the product polyester to reduce the commercial value of the final product prepared from such polyester.

In order to avoid such objectionable coloring we experimented on the concurrent use with the aforesaid catalyst of phosphoric acid, phosphorous acid or their derivatives which are known stabilizers, to find that such phosphorus compounds greatly impair the activity of the catalyst and are therefore, undesirable.

To wit, when such phosphorus compounds were used, admittedly the product polyester was less colored, but had very low degree of polymerization. Whereas, in order to obtain the polyester of desired degree of polymerization, extremely long reaction time was required, which aggravated the coloring.

We earnestly engaged in an extensive research with the view to find a stabilizer which does not objectionally reduce the catalytic activity of cerium or lanthanum compound but effectively inhibits the coloring phenomenon alone. As the result, we discovered that the use of, among phosphorus compounds, certain types of phosphonic acid or its derivatives achieves the desired effect, and arrived at the subject invention.

The invention therefore relates to a process which comprises reacting dicarboxylic acid of which at least 80 mol percent is terephthalic acid, or its lower aliphatic ester with glycol to produce diglycol ester of the dicarboxylic acid or its oligomer (the first stage reaction) and further polycondensing the said diglycol ester or its oligomer to produce polyester (the second stage reaction), characterized in that at least the said polycondensation reaction is performed in the presence of
(a) Cerium or lanthanum compound which is soluble in the diglycol ester of the dicarboxylic acid or its oligomer, and
(b) Phosphorus compound of the formula

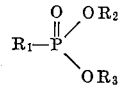

wherein $R_1$ stands for an aralkyl radical, and $R_2$ and $R_3$ each stands for hydrogen, an alkyl or aryl radical, while they may be same or different.

The cerium or lanthanum compound to be employed as the catalyst in the invention must be at least soluble in the diglycol ester of the dicarboxylic acid or its oligomer obtained in the first stage reaction for the polyester formation. Among such compounds, particularly those which are soluble not only in the reaction product of the first stage, but also in the mixture of the starting materials of the first stage reaction as well as in the polyester resultant from the second stage reaction are preferred.

The cerium compounds include both cerous compounds (trivalent) and ceric compounds (tetravalent), but in view of the color tone of the obtained polymer, the cerous compounds are preferred.

The useful catalyst contemplated in the invention includes, for example,
(1) Organic acid salts such as acetate, oxalate, malonate, citrate, benzoate and terephthalate;
(2) Inorganic acid salts such as nitrate, borate, and carbonate;
(3) Halogenides such as chloride and bromide;
(4) Alcoholates such as ethylene glycoxide; and
(5) Hydroxide of cerium and lanthanum.
It is also possible to use double salts or complex salts of cerium or lanthanum which is soluble in the reaction product of the first stage.

In such cerium or lanthanum compounds as enumerated in the above as those which are useful in the invention, in short the metallic part thereof chiefly contributes to their catalytic activity, and therefore, so far as the compounds are soluble in the reaction product of the first stage reaction for polyester formation, they exhibit catalytic activity in the first and second stage reactions. Therefore so far as the cerium or lanthanum compound is soluble in the reaction product of the first stage, it is useful for the present invention regardless of what anion the said compound is composed. When the use of the cerium or lanthanum compound also as the esterification catalyst or ester-interchange reaction catalyst in the first stage reaction for the polyester formation is intended, it is particularly advantageous to select such compound which is soluble in the starting mixture of the materials of the first stage, so that the reaction should proceed homogeneously from the very start.

As the phosphorus compound useful for the process of the invention, especially those represented by the formula

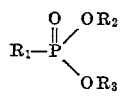

wherein $R_1$ is benzyl, phenylethyl, or tolylmethyl radical; and $R_2$ and $R_3$ may be same or different and each stands for hydrogen, an alkyl radical of 1–5 carbons, cyclohexyl or phenyl radical.

are preferable because of the ease in their production and their excellent coloration-inhibiting effect on polyester without objectionable interference with the catalyst activity.

Furthermore, in the above formula representing the phophorus compound useful for the invention, $R_1$, $R_2$ and $R_3$ may have ester-forming functional groups. But they should preferably have no ester-forming functional groups, because otherwise the phosphorus compound itself participates in the polyester-forming reaction and decreases is stabilizing effect on the catalyst. Again those radicals preferably should not contain halogen atom as a substituent, because generally halogen has a tendency to color the polyester formed.

Specific examples of such phosphorus compound include, for example, phenylmethane, phosphonic acid, dimethyl phenylmethane, phosphonate, diethyl phenylmethane phosphonate, di-i-propyl phenylmethane phosphonate, dimethyl β-phenylethane phosphonate, dimethyl p-tolyl-methane phosphonate, monomethyl-phenylmethane phosphonate, diphenyl phenylmethane phosphonate, dicyclohexyl p-tolylmethane phosphonate, etc.

It is preferred to use such phosphorus compound in an amount ranging from 0.0004–0.05% by weight to the product polyester, in terms of phosphorus atom. Because, with the use of an amount less than 0.0005 wt. percent, it coloration-inhibiting effect on the product polyester is insufficient.

In accordance with the process of the invention thus in the combined system of the aforesaid catalyst and the phosphorus compound, the use of very minor amount of the phophorus compound as above-mentioned is sufficient to achieve the conspicuous result.

According to the invention, it is possible to produce polyester which is free from objectionable coloration at a very high rate of polymerization, by causing the presence of the said cerium or lanthanum compound (catalyst) and the phosphorus compound in the reaction system, at least during the polycondensation stage of the polyester.

Thus, it is within the scope of this invention to perform the first stage reaction for polyester formation in the presence of known, conventional catalyst, and thereafter to carry out the second stage reaction in the presence of the cerium lanthanum compound and the phosphorus compound in accordance with the invention.

However, the cerium or lanthanum compound used in the present invention being highly useful also an esterification catalyst or ester-interchange catalyst in the first-stage reaction, it is preferred in accordance with the invention to add the said cerium or lanthanum compound to the mixture of the starting materials for the first stage reaction of polyester formation and complete the first stage reaction, thereafter adding at an optional stage the second stage reaction, preferably at the time of initiating the second stage reaction, the said phosphorus compound to the reaction system to complete the second stage reaction.

As the "polyester" of the invention, chiefly polyethylene terephthalate is intended, but less than 20 mol percent of the acid component may be substituted by other difunctional acids such as isophthalic, β-oxyethoxybenzoic, p-oxybenzoic, diphenyldicarboxylic, diphenylsulfonedicarboxylic, naphthalenedicarboxylic, sebacic and adipic acids. Also as the glycol component, normally estylene glycol is used, bu the part or all of the ethylene glycol may be substituted by aliphatic, alicyclic, or aromatic dioxy component such as trimethylene glycol, hexamethylene glycol, neopentylene glycol, 1,4-cyclohexanedimethanol, 2,2,4,4 - tetramethylcyclobutanediol - (1, 3) and 1,4-bisoxyethoxybenzene.

Again a monofunctional compound such as benzoylbenzoic acid and methoxy polyethylene glycol may be bonded with a part of the polyester end. Or, the polyester may be that which is copolymerized with a minor amount of pentaerythritol, trimesic acid, etc. to such a degree as will retain its substantially linear state.

When the aforesaid catalyst and the phosphorus compound are concurrently used in accordance with the process of the invention, polyester of excellent whiteness can be obtained very easily, with a rate of polymerization greater than that obtainable with conventionally employed polymerization catalyst such as antimony and titanium compounds. Again the process of the invention is particularly advantageous also in the point that in accordance therewith, same catalyst system can be used for the ester-interchange reaction and polymerization. Further, if desired, other known ester-interchange and/or polymerization catalyst may be concurrently used without departing from the object of the invention.

Hereinafter the invention will be explained with still fuller details with reference to the working examples.

In the examples, the color tone of the polyester was measured by means of Hunter's color difference meter as to the polymer chips, whereby the color tone of polyester is indicated by L, a, and b values. As the norm to indicate the quality of the color tone, the difference between the L value signifying whiteness and the b value indicating the degree of yellowness, $(L-b)$ was used. To wit, the higher $(L-b)$ value means better and lighter color tone of the polyester sample. The intrinsic viscosity of the polyester was calculated from the measured value in ortho-chlorophenol at 35° C. Unless otherwise indicated, the parts are by weight.

EXAMPLE 1

Fifty thousand (50,000) parts of dimethyl terephthalate, 35,000 parts of ethylene glycol and 23 parts of cerium acetate were fed into a reaction vessel equipped with a rectification column and an agitator, and were subjected to the ester-interchange reaction at the temperature of 150–230° C. for the reaction time of about 5 hours, distilling off the theoretical amount of methanol. To the resultant reaction product composed chiefly of bis-(β-hydroxyethyl) terephthalate, 9 parts of diethyl phenylmethane phosphonate and 1250 parts of a slurry composed of 250 parts of titanium dioxide dispersed in 1000 parts of ethylene glycol were added, and thereafter the mixture was sent to a polycondensation vessel. The polycondensation reaction was performed for 4.0 hours while the reaction temperature was gradually raised from 250° C. to 280° C. and the degree of vacuum in the system, from 760 mm. Hg to 1 mm. Hg or below, to produce polyester chips having an intrinsic viscosity of 0.65 and a whiteness in terms of $(L-b)$ value of 76.

For comparison, polycondensation in the similar manner was carried out for 6.0 hours using 7 parts of triethyl phosphate in place of diethyl phenylmethane phosphonate. The resultant polyester had an intrinsic viscosity of 0.59 and a whiteness in terms of $(L-b)$ value of 72. Again, when no stabilizer was used but the reaction was performed in the similar manner for 4.0 hours, the product polyester had an intrinsic viscosity of 0.64 and a whiteness in terms of $(L-b)$ value of 68.

EXAMPLE 2

Forty-five thousand (45,000) parts of dimethyl terephthalate, 5,000 parts of dimethyl isophthalate, 35,000 parts of ethylene glycol and 25 parts of cerium chloride were fed into a reaction vessel equipped with a rectification column and an agitator, and subjected to the ester-interchange reaction at the temperature of 150°–230° C. for the reaction time of about 5 hours, distilling off the theoretical amount of methanol. To the resultant reaction product composed chiefly of bis-($\beta$-hydroxyethyl) terephthalate and isophthalate, 15 parts of diphenyl $\beta$-phenylethane phosphonate and 1250 parts of a slurry composed of 250 parts of titanium dioxide dispersed in 1000 parts of ethylene glycol were added, and thereafter the mixture was sent to a polycondensation vessel and polycondensed in exactly the same manner as described in Example 1. After 3.5 hours of the reaction, polyester chips having an intrinsic viscosity of 0.65 and a whiteness in terms of $(L-b)$ value of 77 was obtained.

For comparison the above polycondensation reaction was repeated except that the diphenyl $\beta$-phenylethane phosphonate was replaced by 4 parts of phosphorus acid. After 6 hours' reaction, polyester chips having an intrinsic viscosity of 0.62 and a whiteness in terms of $(L-b)$ value of 68 was obtained.

EXAMPLES 3–10

110,000 parts of dimethyl terephthalate, 75,000 parts of ethylene glycol and the catalyst of the type indicated in Table 1 below each were fed into a reaction vessel and subjected to the ester-interchange reaction at 160–210° C. which completed within 3 hours with distillation off of methanol. To each resultant reaction product, diethyl phenylmethane phosphonate of the amount each indicated in Table 1, 550 parts of titanium dioxide were added, and they were sent to polycondensation vessels. The inside temperature of the vessels was raised to 275° C. during the initial 30 minutes, and to 285° C. during the subsequent 15 minutes, while the degree of vacuum was raised from 760 mm. Hg to 20 mm. Hg. Further while the temperature of 285° C. was maintained, the degree of vacuum was raised to 1 mm. Hg or below, whereupon the polycondensation reaction was determined. The time required for the polycondensation reaction, and the intrinsic viscosity and color tone of the resultant polymer as to each system were as shown in Table 1 below.

TABLE 1

| | Catalyst | | Amount of Diethyl-phenylmethane phosphonate | | | | | |
|---|---|---|---|---|---|---|---|---|
| Example No. | Compound | Amount, part | Part | Theoretical phosphorus content, wt. percent | Measured phosphorus content, wt. percent | Polycondensation time, hr. | Intrinsic viscosity | Color tone, $L-b$ |
| 3 | Lanthanum benzoate | 81 | 28 | 0.0034 | 0.0031 | 3 | 0.65 | 75 |
| 4 | Cerium oxalate | 104 | 28 | 0.0034 | 0.0030 | 3.5 | 0.65 | 74 |
| 5 | Lanthanum terephthalate | 129 | 28 | 0.0034 | 0.0029 | 4 | 0.64 | 74 |
| 6 | Cerium citrate | 48 | 28 | 0.0034 | 0.0030 | 4 | 0.65 | 73 |
| 7 | Cerium ethylene glycol oxide | 40 | 42 | 0.0051 | 0.0047 | 4 | 0.65 | 72 |
| 8 | Lanthanum nitrate | 63 | 56 | 0.0068 | 0.0063 | 3 | 0.65 | 70 |
| 9 | Cerium hydroxide | 93 | 42 | 0.0051 | 0.0048 | 4 | 0.65 | 73 |
| 10 | Cerium carbonate | 80 | 28 | 0.0034 | 0.0031 | 4.5 | 0.63 | 74 |

EXAMPLES 11–15

The same starting materials as of Example 3 except that cerium acetate or lanthanum acetate in the amount each indicated in Table 2 was used as the catalyst and phosphonate compound of the type each indicated also in Table 2 was used as the stabilizer, were subjected to the ester-interchange reaction and the polycondensation reaction in the similar manner as described in Example 3. The polycondensation time required, and the intrinsic viscosity and color tone of the resultant polymer as to each system were as shown in Table 2.

Note that the stabilizer used in Example 14, bis-$\beta$-hydroxy-ethyl-phenylmethane phosphonate is the reaction mixture obtained in the following manner. Twenty-one (21) parts of diethyl-phenylmethane phosphonate and 25 parts of ethylene glycol were placed in a reaction vessel equipped with an agitator and reacted at 180° C. until the theoretical amount of ethanol (5 parts) was distilled off, and thereafter the excessive ethylene glycol was removed from the system by suction.

TABLE 2

| Catalyst | | Stabilizer | | | | | | |
|---|---|---|---|---|---|---|---|---|
| Compound | Amount, part | Compound | Amount, part | Theoretical phosphorus content, wt. percent | Measured phosphorus content, wt. percent | Polycondensation time, hr. | Intrinsic viscosity | Color tone, $L-b$ |
| Example No.: | | | | | | | | |
| 11 — Cerium acetate | 49 | Di-isobutyl-phenylmethane phosphonate | 69 | 0.0085 | 0.0079 | 3.5 | 0.65 | 74 |
| 12 — Lanthanum acetate | 49 | Monoethyl-$\beta$-phenylethane phosphonate | 52 | 0.0064 | 0.0062 | 4 | 0.64 | 71 |
| 13 — Cerium acetate | 30 | Dicyclohexyl-phenylmethane phosphonate | 49 | 0.0061 | 0.0057 | 4 | 0.65 | 74 |
| 14 — do | 30 | Bis-$\beta$-hydroxyethyl-phenylmethane phosphonate | 63 | 0.0068 | 0.0064 | 4.5 | 0.65 | 73 |
| 15 — Lanthanum acetate | 45 | Diethyl-p-carbomethyloxy-phenylmethane phosphonate | 70 | 0.0073 | 0.0069 | 4 | 0.65 | 72 |

EXAMPLE 16 AND CONTROLS 1–3

Fifty thousand (50,000) parts of dimethyl terephthalate, 35,000 parts of ethylene glycol and each indicated type and amount of catalyst as in Table 3 was fed into a reaction vessel, and subjected to the ester-interchange reaction for 3.5–5.0 hours in the manner similar to Example 1. To each of the resultant reaction products, phosphorus compound as shown in Table 3 and 1250 parts of a slurry composed of 250 parts of titanium dioxide dispersed in 1000 parts of ethylene glycol were added, and the mixtures were sent to polycondensation vessels to be polycondensed to form polyesters in the similar manner as in Example 1.

The polycondensation time required in each case and intrinsic viscosity and whiteness of the each resultant polymer are shown in Table 3.

raised from 250° C. to 278° C., and the degree of vacuum of the system, from 760 mm. Hg to 2 mm. Hg. Thereafter the reaction temperature was gradually raised to 285° C. and the degree of vacuum of the system, to 1 mm. Hg or below, while the polycondensation reaction was continued for 2 hours. At that point, 61 parts of p-tolylmethane phosphonic acid was added to the system without interrupting the vacuum of the system, by means of a throw-in device provided with a preheater.

TABLE 3

| | Catalyst | | Stabilizer | Polycondensation time, hr. | Intrinsic viscosity | Whiteness, $L-b$ |
|---|---|---|---|---|---|---|
| Run No.: | | | | | | |
| 1 (Control) | Calcium acetate, 40 parts | | 50% aqueous phosphorus acid solution, 35 parts | 6.5 | 0.64 | 69 |
| | Antimony trioxide, 10 parts | | | | | |
| 2 (Control) | Calcium acetate, 40 parts | | Diethyl phenylmethane phosphonate, 40 parts | 6.5 | 0.65 | 73 |
| | Antimony trioxide, 10 parts | | | | | |
| 3 (Control) | Cerium acetate, 20 parts | | 50% aqueous phosphorous acid solution, 35 parts | 6.4 | 0.65 | 68 |
| | Antimony trioxide, 10 parts | | | | | |
| 4 (Example 16) | Cerium acetate, 20 parts | | Diethyl phenylmethane phosphonate, 40 parts | 4.1 | 0.65 | 74 |
| | Antimony trioxide, 10 parts | | | | | |

In the Run No. 1 (Control 1) wherein calcium acetate alone was used as the catalyst, as well known, polyester of required degree of polymerization was not obtained. Therefore, antimony trioxide was concurrently used with calcium acetate, resulting in the polyester of unsatisfactory whiteness.

In the Run No. 2 (Control 2), diethyl phenylmethane phosphonate was used as the phosphorus compound and thereby the color tone of the product polyester was improved, but the polycondensation time was not at all shortened. From the results of the Run Nos. 1 and 2, it is verified that the polycondensation catalytic activity of antimony trioxide is in no way changed when the concurrently employed stabilizer is changed from phosphorous acid to diethyl phenylmethane phosphonate.

Similar results were obtained when alkaline earth metal compound or alkali metal compound other than calcium compound was used as the catalyst. To wit, combined use of such metallic compounds with the phosphorus compound contemplated in the invention did not achieve the shortening of the polycondensation reaction time, although the color tone of polyester was thereby improved.

On the other hand, as shown in the Run No. 3 (Control 3), even with cerium acetate the polycondensation time was not shortened when it was used in combination with a conventional stabilizer such as phosphorous acid, and it can be understood that the catalytic activity of cerium acetate is impaired by phosphorous acid. Furthermore, the whiteness of the resultant polyester was neither improved.

In the Run No. 4 (Example 16), cerium acetate was used as the catalyst and diethyl phenylmethane phosphonate, as the stabilizer, in accordance with the subject invention. The result clearly indicates that in the same run, polycondensation reaction time for the preparation of polyester was shortened, and the so produced polyester had excellent whiteness.

EXAMPLE 17

Twenty-five thousand (25,000) parts of terephthalic acid, 17,000 parts of ethylene glycol and 25 parts of commercial grade acetate of rare earth element composed of cerium acetate 30%, lanthanum acetate 30%, neodymium acetate 20% and acetate of other lanthanide element 20% were fed into a reaction vessel equipped with a rectification column and an agitator. After nitrogen-substituting the atmosphere in the reaction vessel, the reaction mixture was heated, and at a pressure of 2 kg./cm.² and a temperature of 220°–235° C. the theoretical amount of water was distilled off after about 5 hours. Thus a reaction product composed chiefly of bis-(β-hydroxyethyl) terephthalate was obtained, which was subsequently added with 500 parts of a slurry composed of 1100 parts of titanium dioxide dispersed in 4400 parts of ethylene glycol, and sent to a polycondensation vessel. During the following 30 minutes, the temperature of the reaction mixture was In succession the polycondensation reaction was advanced at 285° C. and 1 mm. Hg or below, and when the viscosity of the reaction mixture rose so that the agitating electric power reached the predetermined value, the reaction was terminated. The resultant molten polymer was extruded into ribbons, solidified by cooling and cut into chips. The time required from the addition of p-tolylmethane phosphonic acid to the termination of the reaction was, in this case, 2 hours.

Thus obtained polyester had an intrinsic viscosity of 0.65 and a whiteness in terms of $(L-b)$ value of 75.

For comparison, polyester was prepared in the similar manner except that the p-tolylmethane phosphonic acid was replaced by 38 parts of an aqueous normal phosphoric acid solution of 85% concentration. In that case, the polyester obtained after 4.5 hours' reaction after the addition of the normal phosphoric acid had an intrinsic viscosity of 0.61 and a whiteness in terms of $(L-b)$ value of 70.

We claim:
1. In a process for the preparation of white fiber forming polyesters by reacting, in a first stage, a dicarboxylic acid component comprising at least 80 mol percent terephthalic acid or a lower aliphatic ester of terephthalic acid with a glycol to form diglycol ester of said dicarboxylic acid or an oligomer thereof and, in a second stage, polycondensing said diglycol ester of said dicarboxylic acid or oligomer thereof to form said white fiber forming polyester, the improvement which comprises conducting at least the second stage in the presence of
   (a) as a catalyst, a catalytic amount of a compound selected from cerium and lanthanum compounds soluble in the diglycol ester of the dicarboxylic acid or oligomer thereof, and
   (b) as a color inhibitor, in an amount of from 0.005– 0.05% by weight of the fiber forming polyester, calculated as metal phosphorus, a phosphorus compound of the formula

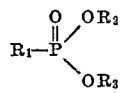

wherein $R_1$ is an aralkyl radical and $R_2$ and $R_3$ are each selected from the group consisting of hydrogen, alkyl, cycloalkyl and aryl radicals.

2. The process of claim 1, wherein the dicarboxylic acid or its lower aliphatic ester is terephthalic acid or dimethyl terephalate, and the glycol is ethylene glycol.

3. The process according to claim 1, wherein the cerium or lanthanum compound comprises at least one compound selected from the group consisting of organic carboxylates, alcoholates, inorganic acid salts and hydroxides of cerium or lanthanum, said cerium or lanthanum compound being soluble in the diglycol esters of said dicarboxylic acid or its oligomers.

4. The process according to claim 1, wherein said phosphorus compound comprises a compound represented by the formula

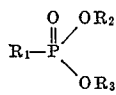

wherein $R_1$ is a benzyl, phenylethyl or tolylmethyl radical; and $R_2$ and $R_3$ are each selected from the group consisting of hydrogen, an alkyl radical of 1–5 carbons, cyclohexyl or phenyl radical.

5. In a process for the preparation of white fiber forming polyesters by reacting in a first stage, a dicarboxylic acid component comprising at least 80 mol percent terephthalic acid or a lower aliphatic ester of terephthalic acid with a glycol to form a diglycol ester of said dicarboxylic acid or an oligomer thereof and, in a second stage, polycondensing said diglycol ester of said dicarboxylic acid or oligomer thereof to form said white fiber forming polyester, the improvement which comprises conducting said first stage in the presence of
 (a) as a catalyst, a catalytic amount of a compound selected from cerium and lanthanum compounds soluble in the diglycol ester of the dicarboxylic acid or oligomer thereof, and adding to said second stage, still containing said catalyst,
 (b) as a color inhibitor, in an amount of from 0.0005–0.05% by weight of the fiber forming polyester, calculated as metal phosphorus, a phosphorus compound of the formula

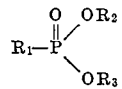

wherein $R_1$ is an aralkyl radical and $R_2$ and $R_3$ are each selected from the group consisting of hydrogen, alkyl, cycloalkyl and aryl radicals.

6. The process according to claim 5, wherein the dicarboxylic acid or its lower aliphatic ester is terephthalic acid or dimethyl terephthalate and the glycol is ethylene glycol.

7. The process according to claim 5, wherein the cerium or lanthanum compound comprises at least one compound selected from the group consisting of organic carboxylates, alcoholates, inorganic acid salts and hydroxides of cerium or lanthanum, said cerium or lanthanum compound being soluble in the diglycol esters of said dicarboxylic acid or its oligomers.

8. The process according to claim 5, wherein the phosphorus compound comprises a compound represented by the formula

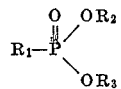

wherein $R_1$ is a benzyl, phenylethyl or tolylmethyl radical, and $R_2$ and $R_3$ are each selected from the group consisting of hydrogen, an alkyl radical of 1–5 carbons, cyclohexyl or phenyl radical.

References Cited

UNITED STATES PATENTS

| | | | |
|---|---|---|---|
| 2,820,023 | 1/1958 | Cavanaugh | 260—75 |
| 2,916,474 | 12/1959 | Engle | 260—75 |
| 2,998,412 | 8/1961 | Fletcher | 260—75 |
| 3,028,366 | 4/1962 | Engle. | |
| 3,110,547 | 11/1963 | Emmert | 260—75 |
| 3,245,959 | 4/1966 | Roeser | 260—75 |
| 2,643,989 | 6/1953 | Auspos et al. | 260—75 |
| 3,412,070 | 11/1968 | Jakob et al. | |

FOREIGN PATENTS

| | | |
|---|---|---|
| 1,326,223 | 3/1963 | France. |
| 1,370,632 | 7/1964 | France. |
| 1,016,511 | 1/1966 | Great Britain. |

WILLIAM H. SHORT, Primary Examiner

L. P. QUAST, Assistant Examiner

U.S. Cl. X.R.

260—45.7, 47, 470, 473, 475, 485